United States Patent Office 3,422,948
Patented Jan. 21, 1969

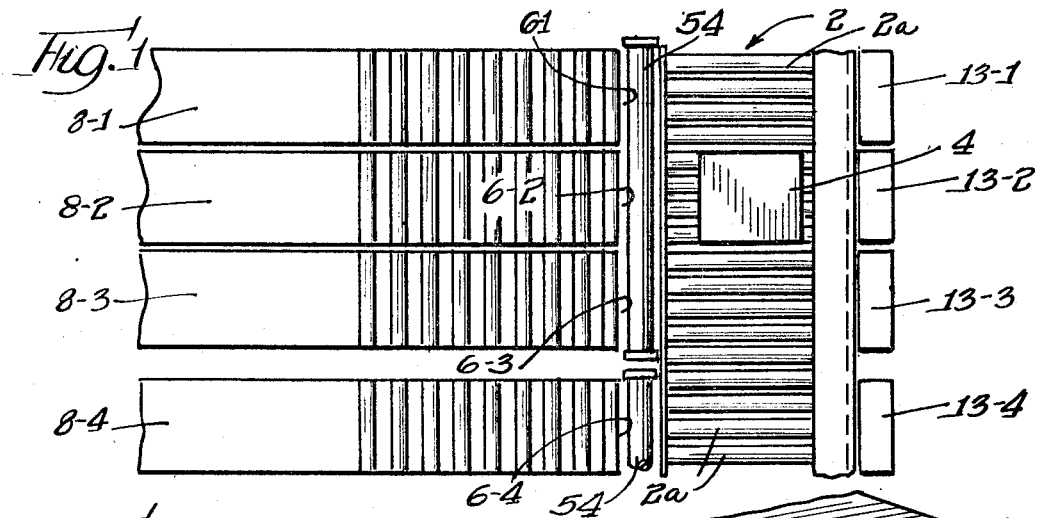
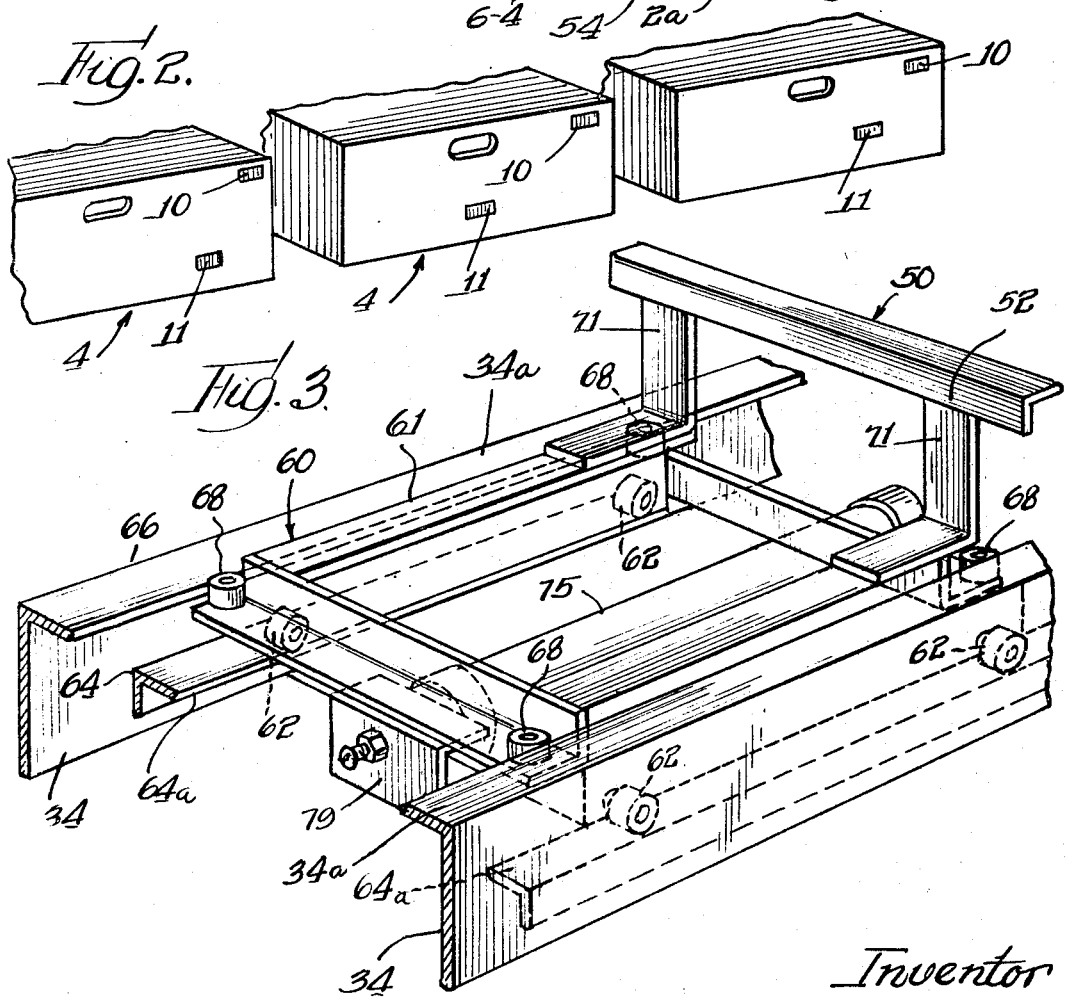

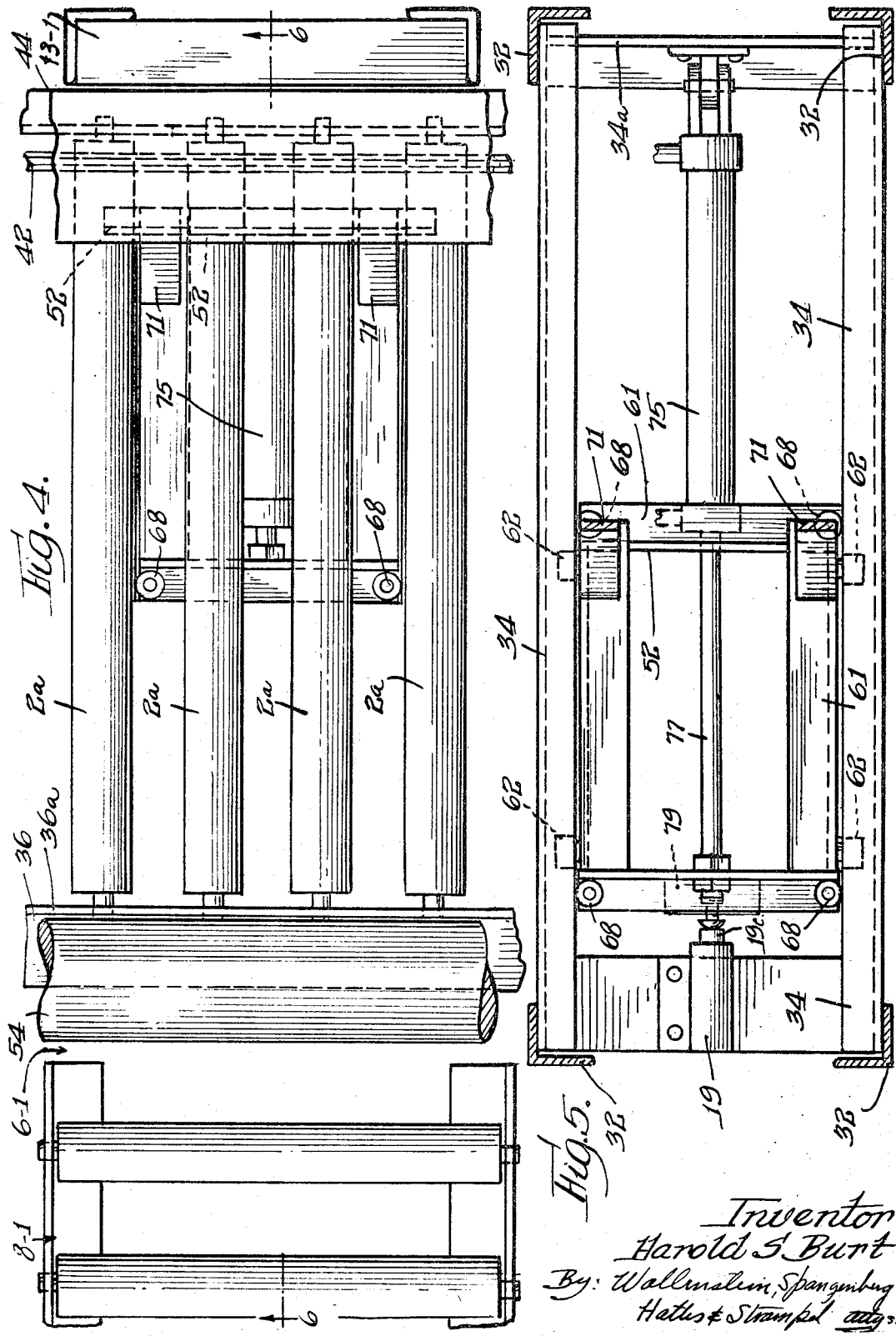

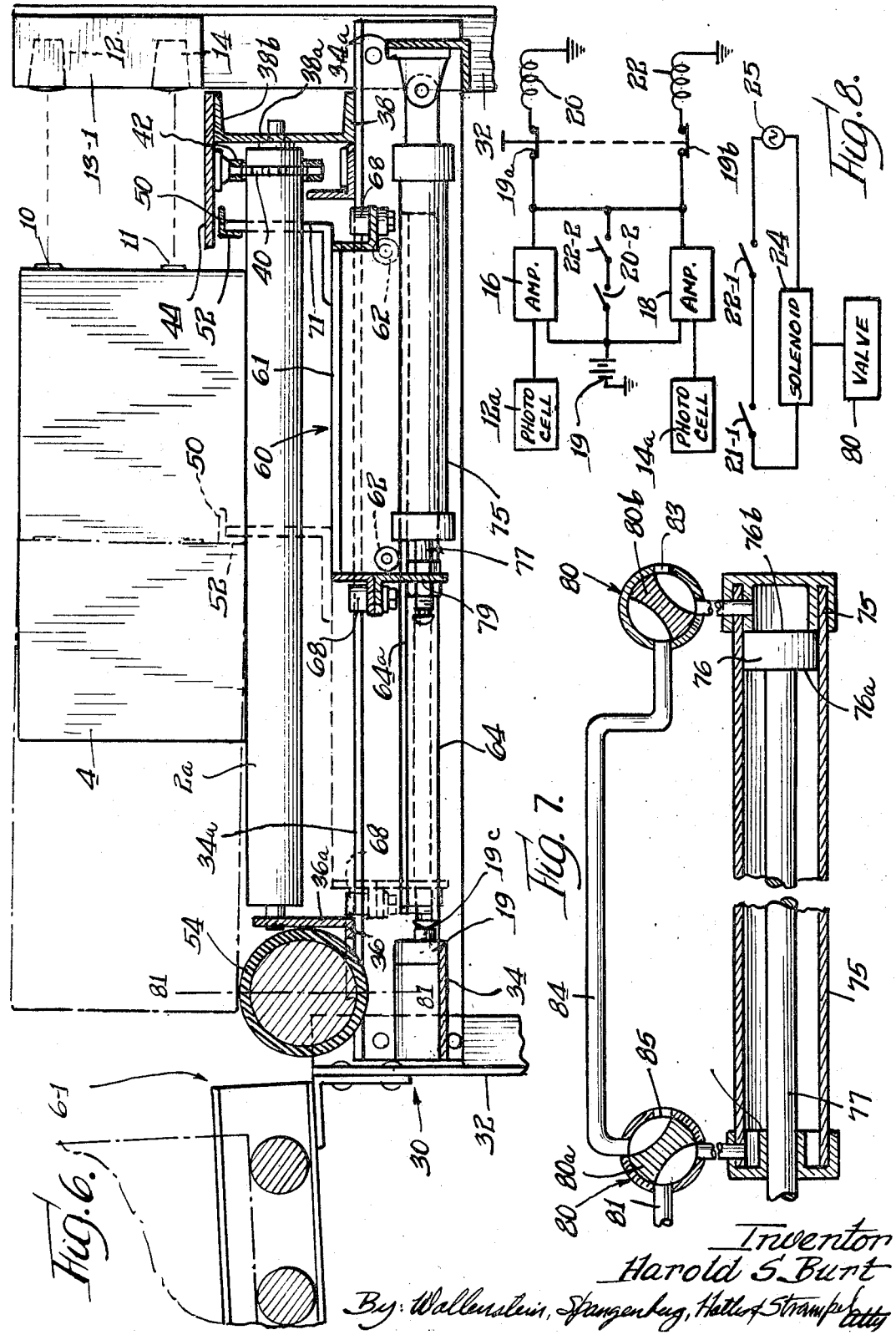

3,422,948
APPARATUS FOR DISCHARGING ARTICLES
FROM A MOVING CONVEYOR
Harold S. Burt, Wilmette, Ill., assignor to Conveyor Systems, Inc., Morton Grove, Ill., a corporation of Illinois
Filed Mar. 6, 1967, Ser. No. 620,983
U.S. Cl. 198—24                    2 Claims
Int. Cl. B65g 47/82

ABSTRACT OF THE DISCLOSURE

A conveyor comprising longitudinally spaced cylindrical rollers is preferably provided with a reciprocating carriage opposite each discharge station thereof, the carriage having arms extending upwardly between the rollers and carrying a straight elongated article pushing and orienting member normally positioned on the side of the rollers remote from the discharge station. When an article approaches its discharge station, the carriage quickly reciprocates back and forth once a short distance transversely of the conveyor to move the pushing member back and forth only part way across the conveyor, the pushing member engaging and pushing the article partially off the discharge station containing side of the conveyor where the projecting end thereof rides up onto a continuously rotating cylindrical friction roller which engages the article simultaneously at various points along the length and pulls the same quickly completely off the conveyor onto the discharge station.

The present invention relates to apparatus for discharging an article from a moving conveyor by means which pushes the article off the conveyor.

In those conveyor systems which selectively discharge articles at one or more discharge stations by pushing the selected articles off the conveyor at a selected discharge station, it is common to provide a reciprocating article pushing member which normally is positioned on the side of the conveyor remote from the discharge station where it is beyond the path of movement of the articles on the conveyor. When an article discharge operation is desired, the article pushing member is impelled at the proper time to engage the side of the article to be discharged and push the same completely off of the conveyor onto the discharge station. In such case, the article pushing member must move substantially across the entire width of the conveyor and return to its initial position before the next article on the conveyor comes by. Since there are practical limitations on the speed with which the reciprocating article pushing member can be reciprocated, the speed of movement of the conveyor must be restricted accordingly to allow the article pushing member to operate in the manner described. The present invention is a significant improvement over these prior conveyor systems in that it permits a conveyor system of the type described to be operated at much higher speeds.

One of the basic features of the present invention is the provision of an article pushing member normally positioned on one side of the conveyor remote from the discharge station involved. The pushing member is mounted for movement only part way across the continuously moving conveyor so the article engaged thereby is pushed by the pushing member to a point where only the marginal portion thereof projects beyond the conveyor. There is further provided a continuously operating article pulling means, which is preferably a continuously rotating cylindrical friction roller, positioned at an elevation slightly above that of the conveyor and which engages the marginal portion of the article involved and quickly pulls the same from the conveyor. The pushing member is thus moved a very short distance in accordance with the present invention so the time required to reciprocate the same into and out of the path of movement of an article on the conveyor is only a fraction of the time required by the prior art where the pushing member must move fully across the width of the conveyor. Therefore, a conveyor utilizing the present invention can be operated much faster than similar type conveyors of the prior art.

Where the article pulling means is a cylindrical friction roller, the axis of the roller is preferably directed parallel to the direction of movement of the articles on the conveyor. The article pushing member most advantageously comprises a straight edged member extending parallel to the axis of rotation of the friction roller and is of sufficient length that the center of gravity of an article to be discharged remains opposite the pushing member while it is engaged by the same. In such case, where the article is a straight sided article, the side thereof facing the friction roller will be parallel to the axis of rotation of the friction roller when engaged thereby, so the marginal portion of the article will be engaged for its full length simultaneously by the cylindrical roller where it will be impelled transversely of the conveyor onto the discharge station.

The above and other advantages and features of the invention will become apparent upon making reference to the specification to follow, the claims and the drawings wherein:

FIG. 1 is a plan view of a portion of a roller conveyor opposite which a number of discharge stations are located;

FIG. 2 is a fragmentary perspective view of rectangular articles carried by the conveyor;

FIG. 3 is a perspective view of the preferred article discharging apparatus of the invention utilized opposite each discharge station of the conveyor system shown in FIG. 1, the apparatus including separate article pushing and pulling means;

FIG. 4 is a greatly enlarged plan view of the portion of the roller conveyor overlying the article discharging apparatus of FIG. 3;

FIG. 5 is a plan view corresponding to FIG. 1 when the article pushing means has reached its limit of travel where it has pushed an article part way off the conveyor;

FIG. 6 is a vertical sectional view taken along section lines 6—6 in FIG. 4;

FIG. 7 is a vertical sectional and partly diagrammatic view through the air cylinder shown in FIG. 6 and associated valve apparatus; and FIG. 8 is a block diagram of the electrical control circuit for controlling the valve apparatus of FIG. 7.

Refer now more particularly to FIG. 1 which shows a portion of the roller conveyor system generally indicated by reference numeral 2. The roller conveyor there shown comprises longitudinally spaced rollers 2a which are driven in the same direction to impart movement to articles 4 carried on the top of the rollers 2a. The roller conveyor system 2 passes by a large number of discharge stations 6–1, 6–2 and 6–3 etc. Any given article 4 can be selectively discharged at any preselected discharge station in any well known suitable way. The discharge stations may be the inlet sides of discharge chutes roller or belt conveyors, etc. generally identified by reference numerals 8–1, 8–2, 8–3 etc., extending transversely from the conveyor system. As illustrated in FIG. 2, the means for determining what particular article is discharged at a particular discharge station includes light reflecting strips 10 and 11 secured to the vertical sides of the articles 4 facing away from the discharge stations. The light reflecting strips 10 and 11 on each article 4 are placed in vertically and horizontally spaced relation, the horizontal spacing between the center lines of the light reflecting strips 10 and 11 being varied in accordance with the particular station at which the given article is to be discharged.

There is provided for each discharge station on the side of the conveyor system opposite the side adjacent thereto a control station 13–1, 13–2 or 13–3 etc. each including a pair of vertically and horizontally spaced light transmitting and photocell units 12 and 14 which are respectively at the elevations of the light reflecting strips 10 and 11 on the article 4. Each pair of the light transmitting and photocell units 12 and 14 at each station are spaced horizontally at different distances which identifies the associated discharge station 1. Each light transmitting and photocell unit 12 or 14 includes a light source which transmits a light beam horizontally toward the articles 4 on the conveyors and a photocell for receiving the light reflected from the reflecting strips 10 and 11. It is assumed that the vertical sides of the articles 4 are made of a relatively poor light reflecting material except for the light-reflecting strips 10 and 12 applied thereto, so when an article is moved opposite a discharge station at which it is to be discharged, the vertically and horizontally spaced light reflecting strips 10 and 11 thereon are in alignment with the associated light transmitting and photocell units 12 and 14 where the amount of light reflected by the light reflecting strips involved onto the photocells will be of sufficient intensity to effect a control function to be described.

FIG. 8 shows diagrammatically photocell 12a and 14a of a control station which receive reflected light from the light reflecting strips 10 and 11 of an article. The output of the photocells 12a and 14a are coupled to respective amplifiers 16 and 18 which control associated relays 20 and 22. The relays 20 and 22 have normally open contacts 20–1 and 22–1 connected in series with a solenoid 24 and a source of voltage 25. The solenoid 24 is energized only when both relays are initially energized together. Energization of the solenoid initiates an article discharging operation in a preferred manner to be later described. When the photocells receive a high intensity of light, stages of the amplifiers 16 and 18 become highly conductive to couple energizing current from a source 19 of D.C. voltage to the coils of relays 20 and 22. When the relays 20 and 22 are thus initially energized, a holding circuit is established by holding contacts 20–2 and 22–2 thereof connected in series between the D.C. voltage source 19 and the coils of relays 20 and 22. Accordingly, simultaneous energization of relays 20 and 22 will energize this holding circuit and energize the solenoid 24. The energization of the relays 20 and 22 is terminated by the momentary opening of normally closed contacts 19a and 19b respectively connected in the circuit between the contacts 20–2 and 22–2 and their respective relays.

Refer now more particularly to FIG. 6 which shows the roller conveyor including a suitable support framework 30 with vertical angle members 32 supporting transversely extending angle members 34, in turn, supporting aligned longitudinally extending angle members 36 positioned on the side of the roller conveyor nearest the discharge stations. The angle members 36 have a vertical leg 36a which rotatably supports one end of the various longitudinally spaced rollers 2a which extend above the elevation of the angle members. The other ends of the rollers 2a are rotatably supported on the web 38a of aligned channel members 38 on the side of the roller conveyor remote from the side containing the discharge stations. The channel members are supported upon the upper legs 34a of the transversely extending angle members 34.

The rollers 2a have sprockets 40 affixed thereto which are engaged by an endless chain 42 driven in any suitable way to impart rotation to the rollers 2a. Narrow cover plates or strips 44 are most advantageously anchored to the upper flanges 38b of the channel members 38 so the cover plates project over the end portions of the rollers 2a, the sprockets 40 and associated chain 42. The articles 4 thus ride upon the portions of the rollers 2a within the inner margin of the cover plates 44. As previously indicated, the details of construction of the rollers conveyor form no part of the present invention. However, the particular exemplary form of the invention to be described is designed primarily to operate in conjunction with the roller conveyor just described, it being understood that the broad aspects of the present invention are not limited to the particular exemplary form of the invention to be described.

As best seen in FIG. 3 and FIG. 6, the present invention provides opposite each discharge station a pushing member 50 which is normally positioned out of the path of travel of the articles 4 beneath the cover plates 44. The pushing member 50 is most advantageously a straight sided elongated member positioned above the level of the rollers 2a and below the margins of the cover plates 44. Where the articles to be discharged are straight sided rectangular box-like articles as illustrated, the pushing member 50 has a vertical article engaging face 52 which extends parallel to the direction of movement of the articles on the roller conveyor where the articles are to be discharged in a direction transverse to this direction. The pushing member 50 is mounted for reciprocating movement between the position where it is out of the path of movement of the articles to the fully extended position best shown in FIG. 5, where the pushing member has moved only a fraction of the length of the rollers 2a. In this position, the article engaging face 52 of the pushing member 50 is spaced from a vertical plane 81—81 (FIG. 6) on the discharge station side of the roller conveyor a distance approximately equal to the corresponding dimension of the smallest article 4 to be carried on the roller conveyor. The vertical plane 81—81 defines the position where an article pulling means 54 is mounted opposite each discharge station to engage and pull the article involved pushed to one side of the roller conveyor quickly off the conveyor.

The article impelling means 54 is most advantageously a continuously rotating longitudinally extending cylindrical friction roller 54 positioned a small distance above the level of the conveyor rollers 2a so it will engage and raise the marginal portion of the article 4 which has been pushed beyond the margin of the roller conveyor. The axis of rotation of the friction roller extends transverse to the desired direction of movement of the article off the conveyor. Where the discharge stations are positioned in contiguous relation as shown in FIG. 1, it is preferable that a single friction roller 54 be utilized for a number of discharge stations (FIG. 1).

If the coefficient of friction between the periphery of the impelling roller 54 and the bottom of the article involved is substantially greater than the coefficient of friction between the conveyor rollers 2a and the bottom of the article, the article will be readily quickly pulled from the conveyor. The conveyor roller 2a may be made of a metal and the friction roller 54 may be made of a friction material like rubber.

Where a straight sided article is involved, the friction roller 54 should simultaneously engage the same along its entire length. This is accomplished when the article presents a longitudinally extending surface extending parallel to the axis or rotation of the friction roller 54 as it is engaged thereby. This proper orientation of the article 4 as it is pushed beyond the roller conveyor by the pushing member 50 is achieved if the center of gravity of the article is within the margins of the pushing member 50 during the period it is engaged by the vertical face 52 of the pushing member.

The pushing member 50 illustrated in the drawings is reciprocated back and forth by means including a carriage 60 (FIG. 3) which has a rectangular frame 61 carrying depending vertical rollers 62 at the corners thereof which ride on the horizontally oriented legs 64a—64a of a pair of angle members 64—64 secured to a pair of the angle members 34—34. The carriage frame 61 further carries horizontally disposed rollers 68 at the corners thereof which engage the parallel edges of the upper legs 34a—34a of the angle members 34—34.

As best shown in FIG. 6, the carriage frame 61 is mounted for movement below the rollers 2a of the roller conveyor 2 and the carriage frame 61 has attached thereto vertical arms 71—71 (FIG. 3) which extend above the rollers 2a through spaces between these rollers. The article pushing member 50 is carried between the upper ends of the arms 71—71.

The preferred means for moving the carriage frame 61 between its extreme positions includes an air cylinder 75 (FIGS. 6–7) having a piston 76 which is connected to a piston rod 77 secured to a bracket 79 anchored to the frame carriage 61. The air cylinder 75 is supported on a cross member 78 extending between a pair of the upright angle members 32—32 (FIGS. 4 and 5). The piston 76 has an end face 76a within the cylinder 75 which has a smaller area than the opposite face 76b of the piston. Normally, a rotary valve section 80a of a valve assembly 80 operated by the solenoid 24 (FIG. 8) interconnects a high pressure conduit 81 to the left end of the cylinder 75 as viewed in FIG. 7, the high pressure being applied against the small area face 76a of the piston 76 to drive the same to the right end of the cylinder 75. A valve section 80b vents the right end of the cylinder 75 to atmosphere through a vent opening 83.

When an article is moved opposite a discharge station at which the article is to be discharged, solenoid 24 is energized in the manner previously explained. Energization of the solenoid operates the valve sections 80a and 80b so that the pressure inlet conduit 81 is connected through conduit 84 and the valve sections 80a and 80b to the right end of cylinder 75 behind the large area side of the piston 76, so the piston 76 moves to the left end of the cylinder. This operation of the valve section 80a vents the left end of the cylinder 75 to atmosphere through a vent opening 85 in the valve.

When the piston 76 reaches the end of its path of travel, rod 77 thereof strikes an operating pin 19c (FIG. 6) of a switch assembly 19 which opens the holding circuit breaking contacts 19a and 19b (FIG. 8) to break the holding circuits of the relays 20 and 22 to de-energize the same. With the de-energization of the relays 20 and 22, solenoid 24 becomes de-energized and the valve sections 80a and 80b return to their initial positions where the piston 76 is forced to the right hand of the cylinder 75 by the high pressure condition restored to the left end of the cylinder 75.

It should be understood that numerous modifications may be made in the most preferred form of the invention described above without deviating from the broader aspects thereof.

I claim:

1. In a conveyor system including conveyor means for conveying articles longitudinally along a given path and for discharging the articles laterally from the conveyor means at any one of a number of discharge stations while the articles are in motion along the conveyor means, apparatus for discharging the articles from the conveyor means at a selected discharge station, said apparatus comprising: article pusher means mounted for movement laterally over said conveyor means at each discharge station and having a normal inoperative position where the pusher means is on the side of the conveyor means remote from the side thereof at which the discharge station is located and out of the path of movement of the article on the conveyor means and an article discharging position where the pusher means has moved only part way across the conveyor means toward the discharge station where it is spaced inwardly from the latter side of the conveyor means less than the correponding dimensions of the article so an article engaged thereby is pushed into a position where only a portion of the article extends beyond the conveyor means, and continuously moving article removing means for engaging an article extending part way beyond the side margin of the conveyor means and pulling the same completely off of the conveyor means onto the discharge station, said article removing means being a continuously operating cylindrical roller having its axis extending parallel to the direction of movement of the articles past each discharged station and elevated to engage the first portion of the article projecting beyond the conveyor means involved.

2. The conveyor system of claim 1 wherein said pusher means includes article engaging means for engaging an article and orienting the same so that substantially all projecting portions of the article along the length thereof will be simultaneously engaged by the roller when the articles are first engaged by said roller.

References Cited

UNITED STATES PATENTS

| 2,657,784 | 11/1953 | Stoker | 198—24 X |
|---|---|---|---|
| 2,890,675 | 6/1959 | Cheever | 198—24 X |
| 3,018,873 | 1/1962 | Burt | 198—38 |
| 3,181,685 | 5/1965 | Brunner | 198—185 X |
| 3,321,063 | 5/1967 | Blume | 198—38 |

EDWARD A. SROKA, *Primary Examiner.*